United States Patent [19]

Wirth et al.

[11] 4,385,147

[45] May 24, 1983

[54] STABILIZATION OF CHLORINE-CONTAINING THERMOPLASTICS WITH M-AMINOPHENOL DERIVATIVES

[75] Inventors: Hermann O. Wirth; Jürgen Büssing, both of Bensheim; Hans-Helmut Friedrich, Lautertal, all of Fed. Rep. of Germany

[73] Assignee: Ciba-Geigy Corporation, Ardsley, N.Y.

[21] Appl. No.: 300,365

[22] Filed: Sep. 8, 1981

[30] Foreign Application Priority Data

Sep. 16, 1980 [CH] Switzerland .................. 6927/80

[51] Int. Cl.³ .................. C08K 5/20; C08K 5/18; C08K 5/16
[52] U.S. Cl. .................. 524/207; 524/114; 524/119; 524/217; 524/222; 524/178; 524/240; 524/248; 524/399; 524/400
[58] Field of Search .............. 524/248, 207, 222, 218, 524/240, 217; 560/43; 564/200; 260/465 F

[56] References Cited

U.S. PATENT DOCUMENTS

| | | | |
|---|---|---|---|
| 1,899,120 | 2/1933 | Sloan .................. | 260/45.9 |
| 2,654,722 | 10/1953 | Young et al. .................. | 524/241 |
| 2,657,982 | 11/1953 | Hill et al. .................. | 260/45.85 R |
| 2,657,983 | 11/1953 | Hill et al. .................. | 260/398.5 |
| 2,657,983 | 11/1953 | Hill et al. .................. | 260/398.5 |
| 2,730,500 | 1/1956 | Young .................. | 524/222 |
| 2,820,774 | 1/1958 | Myers et al. .................. | 260/45.75 |
| 2,833,636 | 5/1958 | Gleim .................. | 524/248 |
| 3,075,940 | 1/1963 | Pazinski et al. .................. | 260/31.8 |
| 3,079,366 | 2/1963 | Boyle et al. .................. | 260/45.9 |
| 3,079,366 | 2/1963 | Boyle et al. .................. | 260/45.9 |
| 3,139,451 | 6/1964 | Dexter et al. .................. | 260/465 |
| 3,139,451 | 6/1964 | Dexter et al. .................. | 260/465 |
| 3,450,764 | 6/1969 | Altwicker .................. | 260/571 |
| 3,450,764 | 6/1969 | Altwicker .................. | 260/571 |
| 4,025,487 | 5/1977 | Dexter et al. .................. | 524/222 |
| 4,246,198 | 1/1981 | Rosenberger et al. .................. | 524/222 |

FOREIGN PATENT DOCUMENTS 407408 9/1932 United Kingdom .................. 564/200

OTHER PUBLICATIONS

Stapter; Christian and Granick; Joel D. "Antioxidative Stabilization of Polyvinyl Chloride", ACS Div. Polymer Chem. Polyner Preprints Mar. 1971, vol. 12, No. 1, pp. 795 to 803.
Lally et al.—"Stabilization of Polyvinyl Chloride" Modern Plastics Encyclopedia, Dec. 1949, pp. 111, 112, 114, 116 and 156 to 162.
J. Voight "Stabilization of Plastics"—Springer Verlag 1966, p. 286.
CA, 48, 2289i (1954 (=AD).

*Primary Examiner*—V. P. Hoke
*Attorney, Agent, or Firm*—Luther A. R. Hall

[57] ABSTRACT

Chlorine-containing thermoplastics which contain, as a stabilizer, a compound of the formula I

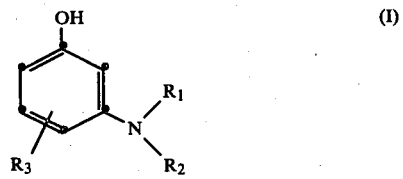

in which $R_1$, $R_2$ and $R_3$ are as defined in the description.

11 Claims, No Drawings

STABILIZATION OF CHLORINE-CONTAINING THERMOPLASTICS WITH M-AMINOPHENOL DERIVATIVES

The present invention relates to the stabilisation of chlorine-containing thermoplastics by addition of m-aminophenols and derivatives.

Chlorine-containing polymers must be protected against the harmful influence of light and heat. In particular, conversion of the plastic to mouldings is accompanied by exposure to heat, which causes darkening and embrittlement if suitable additives are not added. In particular, organo-tin compounds, metal carboxylates or aminocrotonates have hitherto been used as stabilisers. The effect achieved with these additives is, in practice, not always adequate, so that there undoubtedly remains a need for improved, and in particular also metal-free, heat stabilisers.

Aminophenols, for example N-phenyl-m-aminophenol, are in particular known as antioxidants for natural and synthetic rubber (U.S. Pat. No. 3,450,764; compare also J. Voigt "Stabilisation of Plastics", Springer Verlag 1966, page 286). Further, U.S. Pat. Nos. 3,139,451, 3,079,366 and 2,657,983 disclose o- and p-amino-phenols which are used as antioxidants and light stabilisers in chlorine-containing polymers. These publications do not disclose that in addition to the manner of substitution of the amino group, the position of this amino group on the phenol ring might also influence the effectiveness of the stabiliser. In fact, it has been found that it is particularly the m-aminophenols and derivatives which are excellent heat stabilisers for chlorine-containing thermoplastics, for example PVC, which do not exhibit the disadvantages of the prior art, or do not do so to the same degree, and which, in particular, do not necessarily have to be combined with metal compounds.

Accordingly, the invention relates to chlorine-containing thermoplastics which contain a compound of the formula I

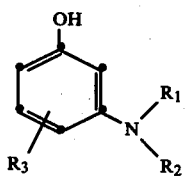

in which $R_1$ is hydrogen, $C_1$-$C_{18}$-alkyl, $C_5$-$C_7$-cycloalkyl, unsubstituted or $C_1$-$C_4$-alkyl-substituted or hydroxyl-substituted phenyl or one of the groups —$C(R_4)$=$C(R_5)$—$COOR_6$, —$CH_2CH_2$—$CN$,

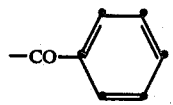

or —CO—$CH_2$—CO—$CH_3$, $R_2$ is hydrogen, $C_1$-$C_{18}$-alkyl, $C_5$-$C_7$-cycloalkyl, unsubstituted or $C_1$-$C_4$-alkyl-substituted or hydroxyl-substituted phenyl or a —$CH_2CH_2$—$CN$ group, $R_3$ is hydrogen, hydroxyl, $C_1$-$C_4$-alkyl, $C_2$-$C_5$-alkoxycarbonyl, aminocarbonyl or cyano, $R_4$ and $R_5$ independently of one another are hydrogen or $C_1$-$C_4$-alkyl and $R_6$ is $C_1$-$C_{18}$-alkyl or $C_5$-$C_7$-cycloalkyl.

As $C_1$-$C_{18}$-alkyl, $R_1$, $R_2$ and $R_6$ are, for example, methyl, ethyl, n-propyl, branched or unbranched heptadecyl or octadecyl, but especially branched or unbranched octyl, nonyl, decyl, undecyl, dodecyl, tridecyl, tetradecyl, pentadecyl or hexadecyl. As $C_5$-$C_7$-cycloalkyl, $R_1$, $R_2$ and $R_6$ are, in particular, cyclopentyl or cyclohexyl. As $C_1$-$C_4$-alkyl-substituted phenyl, $R_1$ or $R_2$ is, for example, methylphenyl, dimethylphenyl, ethylphenyl or isopropylphenyl; as hydroxyl-substituted phenyl, $R_1$ or $R_2$ is, for example, o- or p-hydroxyphenyl, especially m-hydroxyphenyl. As $C_1$-$C_4$-alkyl, $R_3$, $R_4$ and $R_5$ are, for example, methyl, ethyl, isopropyl, butyl or t.-butyl. As $C_2$-$C_5$-alkoxycarbonyl, $R_3$ is, in particular, methoxycarbonyl or ethoxycarbonyl.

Preferably, the chlorine-containing thermoplastics according to the invention contain those compounds of the formula I, in which $R_1$ is hydrogen, branched or unbranched $C_8$-$C_{16}$-alkyl, cyclohexyl, phenyl, methylphenyl or a—$C(R_4)$=$C(R_5)$—$COOR_6$, —$CH_2CH_2$—$CN$,

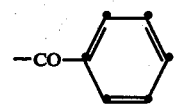

or —CO—$CH_2$—CO—$CH_3$ group, $R_2$ is hydrogen, $R_3$ is hydrogen, hydroxyl, methyl, methoxycarbonyl, aminocarbonyl or cyano, $R_4$ and $R_5$ independently of one another are hydrogen or methyl and $R_6$ is methyl or cyclohexyl.

Particularly preferentially, the chlorine-containing thermoplastics according to the invention contain m-aminophenol, 3-amino-6-methoxycarbonylphenol, N-phenyl-m-aminophenol, N-(2'-methyl)-phenyl-m-aminophenol, N-cyclohexyl-m-aminophenol, N-n-dodecyl-m-aminophenol, 2-amino-4-hydroxybenzonitrile, 2-amino-4-hydroxybenzamide, 3,5-dihydroxy-N-benzoylaniline, methyl 3-(3-hydroxyanilino)-2-methylacrylate, cyclohexyl 3-(3-hydroxyanilino)-3-methylacrylate, 3-hydroxy-5-methyl-diphenylamine, 3-hydroxy-diphenylamine, N-acetoacetyl-m-aminophenol and N-(2-(cyanoethyl)-m-aminophenol.

The compounds of the formula I are known compounds and can be prepared by methods know per se.

The chlorine-containing thermoplastics to be stabilised according to the invention are preferably vinyl chloride polymers or copolymers. Amongst these, suspension polymers and mass polymers, and thoroughly washed, i.e. low-emulsifier, emulsion polymers are preferred. Examples of suitable comonomers for the copolymers are vinyl acetate, vinylidene chloride, trans-dichloroethane, ethylene, propylene, butylene, maleic acid, acrylic acid, fumaric acid and itaconic acid. Other suitable chlorine-containing thermoplastics include post-chlorinated PVC and chlorinated polyolefins, as well as graft polymers of PVC with EVA (ethylene/vinyl acetate) and MBS (methyl acrylate/butadiene/styrene).

The thermoplastics stabilised according to the invention are prepared by known methods. The m-aminophenol stabilisers are added to the chlorine-containing thermoplastics to be stabilised, prior to processing, in conventional equipment; the amount incorporated is in general from 0.05 to 5, preferably from 0.1 to 3, % by weight, based on the chlorine-containing thermoplastic. A homogeneous mixture can be achieved by, for example, using a twin-roll mixer at 150° to 210°.

An even better stabilising action is achieved on additionally using customary amounts of at least one of the conventional PVC stabilisers and/or additives, such as epoxy compounds, preferably epoxidised fatty acid esters, such as epoxidised soybean oil, phosphites, organic metal compounds of metals of the second main group and sub-group of the periodic table, for example metal carboxylates or metal phenolates, especially those derived from carboxylic acids having 8 to 20 C atoms or from phenols having 6 to 20 C atoms, for example Ca stearate or Zn stearate, or inorganic salts of metals of the second sub-group of the periodic table, for example $ZnCl_2$, or organo-tin compounds, especially monoorgano-tin compounds.

Co-stabilisers are preferably incorporated in amounts of 0.05 to 6, especially 0.1 to 3, % by weight, based on the total composition. The ratio of m-aminophenol to co-stabilisers can be about 2:1 to 1:8.

Particularly suitable conventional phosphites are phosphites of the general formulae II, III or IV

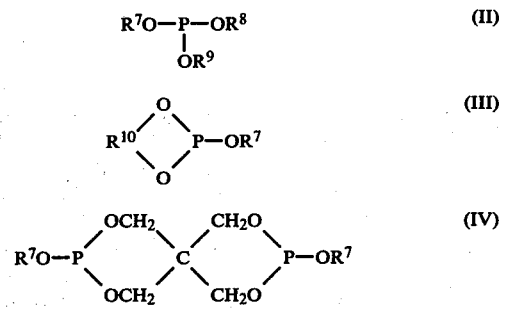

in which $R^7$, $R^8$ and $R^9$, independently of one another, are $C_1$–$C_{18}$-alkyl, $C_1$–$C_{20}$-alkenyl, $C_6$–$C_{12}$-aryl, unsubstituted or hydroxy-substituted or $C_1$–$C_4$-alkoxy-substituted $C_7$–$C_{19}$-alkaryl or $C_5$–$C_7$-cycloalkyl, and $R^{10}$ is unsubstituted or $C_1$–$C_{18}$-alkyl-, $C_2$–$C_{13}$-alkoxymethyl-, alkylthiomethyl- or phenyl-substituted $C_2$–$C_6$-alkylene, unsubstituted or $C_1$–$C_4$-alkyl-substituted $C_6$–$C_{10}$-arylene or $C_5$–$C_7$-cycloalkylene.

Examples of $R^7$, $R^8$ and $R^9$ as $C_1$–$C_{18}$-alkyl are methyl, ethyl, n-propyl, isopropyl, n-butyl, sec.-butyl, tert.-butyl, n-pentyl, n-hexyl, n-octyl, n-nonyl, decyl, dodecyl, tetradecyl, hexadecyl and octadecyl. Alkyl groups having 8 to 18 C atoms are preferred.

Examples of $R^7$, $R^8$ and $R^9$ as $C_1$–$C_{20}$-alkenyl are allyl, 2-butenyl, pentenyl, hexenyl, heptenyl and oleyl.

Examples of $R^7$, $R^8$ and $R^9$ as aryl are naphthyl, biphenyl and, preferably, phenyl.

Examples of $R^7$, $R^8$ and $R^9$ as unsubstituted or hydroxy- or $C_1$–$C_4$-alkoxy-substituted $C_7$–$C_{19}$-alkaryl are tolyl, ethylphenyl, xylyl, cumyl, cymyl, cresyl, 4-methoxyphenyl, 2,4-dimethoxyphenyl, alkoxyphenyl and butoxyphenyl.

Examples of $R^7$, $R^8$ and $R^9$ as $C_5$–$C_7$-cycloalkyl are cyclopentyl, cycloheptyl and especially cyclohexyl.

Examples of $R^{10}$ as unsubstituted or $C_1$–$C_{18}$-alkyl- or phenyl-substituted $C_2$–$C_6$-alkylene are ethylene, propylene or hexamethylene, each of which is substituted by methyl, ethyl, propyl, isopropyl, butyl, hexyl, decyl, dodecyl, tetradecyl, octadecyl or phenyl, and in particular 2-propyl-2-methyl-propylene, 1-propyl-2-ethyl-propylene and phenylethylene, as well as unsubstituted ethylene.

Examples of $R^{10}$ as $C_2$–$C_{13}$-alkoxymethyl- or alkylthiomethyl-substituted $C_2$–$C_6$-alkylene are ethoxymethylethylene, butoxymethylethylene, octyloxymethylethylene and dodecylthiomethylethylene.

Examples of $R^{10}$ as unsubstituted or $C_1$–$C_4$-alkyl-substituted $C_6$–$C_{10}$-arylene are tert.-butylphenylene and unsubstituted phenylene.

As $C_5$–$C_7$-cycloalkylene, $R^{10}$ is in particular cyclohexylene.

Amongst the phosphites of the formula IV, those in which $R^7$ is $C_1$–$C_{18}$ and especially $C_8$–$C_{18}$-alkyl and more particularly octyl or decyl are preferred.

Very particularly suitable phosphites are trioctyl phosphite, tridecyl phosphite, tridodecyl phosphite, tritetradecyl phosphite, tristearyl phosphite, trioleyl phosphite, triphenyl phosphite, tricresyl phosphite, tris-p-nonylphenyl phosphite and tricyclohexyl phosphite and particularly preferred compounds are the aryl dialkyl phosphites and alkyl diaryl phosphites, for example phenyl didecyl phosphite, nonylphenyl didecyl phosphite, 2,4-di-tert.-butylphenyl didodecyl phosphite and 2,6-di-tert.-butylphenyl didodecyl phosphite.

A particularly good stabilising effect is achieved if at least one epoxy compound and/or one metal carboxylate or phenolate of a metal of the second main group of the periodic table, preferably a calcium carboxylate and especially calcium stearate, is added to the m-aminophenols of the formula I. The stabilising action is even better if additionally at least one of the phosphites defined above or at least one zinc carboxylate or cadmium carboxylate or an organo-tin compound is employed. Amongst the organo-tin compounds, monoorgano-tin compounds are preferred.

However, a very particularly good stabilising effect is achieved if the chlorine-containing thermoplastics are stabilised with a mixture of at least one m-aminophenol of the formula I, at least one epoxy compound and/or a metal carboxylate or phenolate of a metal of the second main group of the periodic table, at least one zinc carboxylate or cadmium carboxylate or an organo-tin compound, and at least one of the phosphites defined above.

Surprisingly, even a relatively low concentration of a compound of the formula I produces outstanding stabilisation under these conditions.

Depending on the end use of the stabilised thermoplastic, other additives can also be incorporated before or simultaneously with incorporation of the stabiliser, examples of such additives being lubricants (preferably montan waxes or glycerol esters), fatty acid esters, paraffins, plasticisers, fillers, carbon black, asbestos, kaolin, talc, glass fibres, modifiers (for example additives to increase the impact strength), optical brighteners, pigments, light stabilisers, UV absorbers, flameproofing agents, antistatic agents and other co-stabilisers, for example antioxidants, especially phenolic antioxidants. The thermoplastics according to the invention can be converted to shaped articles by the customary moulding processes for this purpose, for example by extrusion, injection moulding or calendering. The thermoplastics can also be used as plastisols.

The heat stabilisation achieved by means of the stabilisers used according to the invention in the thermoplastics according to the invention is excellent. The light stability is also good.

The examples which follow illustrate the invention; in them, unless stated otherwise, parts are parts by weight and percentages are percentages by weight.

GENERAL DESCRIPTION OF THE TEST

A dry blend, prepared according to one of the recipes A-C described in Examples 1-3, is milled for 5 minutes at 180° C. on a mixing mill. A piece of sheet 0.3 mm thick is cut from the mill hide formed and the yellowness index (YI) of this sample is determined in accordance with ASTM-D 1925-70. The results are summarised in Tables 1-3.

EXAMPLE 1

Dry blend according to recipe A

Recipe A:
 100 g of S-PVC (K value 65)
 2 g of epoxidised soybean oil
 2.5 millimols of test substance (in g)

TABLE 1

| Test substance | YI |
| --- | --- |
| none | about 25 |
| m-Aminophenol | 8.1 |
| N—Phenyl-m-aminophenol | 7.5 |
| N—(2'-Methyl)-phenyl-m-aminophenol | 9.4 |
| N—Cyclohexyl-m-aminophenol | 10.9 |
| N—n-Dodecyl-m-aminophenol | 10.2 |

EXAMPLE 2

Dry blend according to recipe B

Recipe B:
 100 parts of S-PVC (K value 58)
 4.0 parts of epoxidised soybean oil
 0.35 parts of calcium stearate
 0.15 parts of zinc stearate
 0.3 parts of phenyl didecyl phosphite
 0.7 parts of combined lubricant (low molecular weight polyethylene, stearyl alcohol and stearyl stearate)
 0.5 parts of flow improver (copolymer of acrylic acid esters and methacrylic acid esters)
 8.0 parts of high-impact additive (terpolymer of methyl methacrylate, styrene and butadiene)
 0.6 parts of test substance

TABLE 2

| Test substance | YI |
| --- | --- |
| none | about 30 |
| N—Phenyl-m-aminophenol | 4.8 |
| N—(2'-Methyl)-phenyl-m-aminophenol | 3.0 |
| 3-Amino-6-methoxycarbonyl-phenol | 3.6 |
| N—Cyclohexyl-m-aminophenol | 2.2 |
| N—n-Dodecyl-m-aminophenol | 2.1 |

EXAMPLE 3

Dry blend according to recipe C

Recipe C:
 100 g of S-PVC (K value 65)
 2.5 g of epoxidised soybean oil
 1.2 g of tridecyl phosphite
 2.5 millimols of test substance (in g)

TABLE 3

| Test substance | YI |
| --- | --- |
| none | 33-45 |

TABLE 3-continued

| Test substance | YI |
| --- | --- |
| N—Phenyl-m-aminophenyl | 5.2 |
| m-Aminophenol | 4.9 |

EXAMPLES 4-12

A dry blend consisting of the ingredients shown in the recipes below is milled for 5 minutes at 180° C. in a mixing mill. Pieces of test sheet, 0.3 mm thick, are cut from the mill hide formed. The sheet samples are exposed to heat at 180° C. in an oven, and the yellowness index (YI) is determined, according to ASTM D 1925-70, on a sample at intervals of 10 minutes. The results are summarised in the tables below.

EXAMPLE 4

Recipe:
 0.46 part of 3-hydroxy-diphenylamine
 100 parts of S-PVC (K value 64)
 2 parts of epoxidised soybean oil

| | Static heat test (180° C.) | | | | | | |
| --- | --- | --- | --- | --- | --- | --- | --- |
| Exposure time [min] | 0 | 10 | 20 | 30 | 40 | 50 | 60 |
| Yellowness index | 6.5 | 15.3 | 28.4 | 45.3 | 71 | 99 | >100 |

EXAMPLE 5

Recipe:
 0.46 part of 3-hydroxy-diphenylamine
 100 parts of S-PVC (K value 64)
 2 parts of epoxidised soybean oil
 0.28 part of phenyl didecyl phosphite

| | Static heat test (180° C.) | | | | | | |
| --- | --- | --- | --- | --- | --- | --- | --- |
| Exposure time [min] | 0 | 10 | 20 | 30 | 40 | 50 | 60 |
| Yellowness index | 4.3 | 13.8 | 24.5 | 37.3 | 63 | 92 | >100 |

EXAMPLE 6

Recipe:
 0.46 part of 3-hydroxy-diphenylamine
 100 parts of S-PVC (K value 64)
 2 parts of epoxidised soybean oil
 0.28 part of phenyl didecyl phosphite
 0.02 part of zinc neodecanoate

| | Static heat test (180° C.) | | | | | | |
| --- | --- | --- | --- | --- | --- | --- | --- |
| Exposure time [min] | 0 | 10 | 20 | 30 | 40 | 50 | 60 |
| Yellowness index | 3.0 | 8.7 | 15.2 | 28 | 47 | 77 | >100 |

EXAMPLE 7

Recipe:
 0.3 part of 3-hydroxy-diphenylamine
 100 parts of S-PVC (K value 64)
 3 parts of epoxidised soybean oil
 0.35 part of calcium stearate
 0.15 part of zinc stearate
 0.4 part of phenyl didecyl phosphite

| | Static heat test (180° C.) | | | | | | | | |
| --- | --- | --- | --- | --- | --- | --- | --- | --- | --- |
| Exposure time [min] | 0 | 10 | 20 | 30 | 40 | 50 | 60 | 70 | 80 |

-continued

| Static heat test (180° C.) | | | | | | | | | |
|---|---|---|---|---|---|---|---|---|---|
| Yellowness index | 5.2 | 7.9 | 12 | 16.5 | 22 | 35 | 47 | 80 | >100 |

EXAMPLE 8

Recipe:
 0.3 part of 3-hydroxy-diphenylamine
 100 parts of S-PVC (K value 64)
 3 parts of epoxidised soybean oil
 0.35 part of calcium stearate
 0.15 part of zinc stearate
 1.2 parts of phenyl didecyl phosphite

| Static heat test (180° C.) | | | | | | | | | | |
|---|---|---|---|---|---|---|---|---|---|---|
| Exposure time [min] | 0 | 10 | 20 | 30 | 40 | 50 | 60 | 70 | 80 | 90 |
| Yellowness index | 3.0 | 8.4 | 10.3 | 13 | 17 | 27 | 32 | 44 | 61 | 85 |

EXAMPLE 9

Recipe:
 0.6 part of 2-amino-4-hydroxybenzamide
 100 parts of S-PVC (K value 58)
 4 parts of epoxidised soybean oil
 0.35 part of calcium stearate
 0.15 part of zinc stearate
 0.3 part of phenyl didecyl phosphite
 0.7 part of lubricant+)
 0.5 part of flow improvers+)
 8.0 parts of high-impact additive+)

| Static heat test (180° C.) | | | | | | | | | | |
|---|---|---|---|---|---|---|---|---|---|---|
| Exposure time [min] | 0 | 10 | 20 | 30 | 40 | 50 | 60 | 70 | 80 | 90 |
| Yellowness index | 17 | 19.6 | 21.7 | 25.0 | 30.7 | 38.4 | 58.3 | 80.0 | 99 | >100 |

EXAMPLE 10

Recipe:
 0.6 part of 3-hydroxy-5-methyl-diphenylamine
 100 parts of S-PVC (K value 58)
 4 parts of epoxidised soybean oil
 0.35 part of calcium stearate
 0.15 part of zinc stearate
 0.3 part of phenyl didecyl phosphite
 0.7 part of lubricant+)
 0.5 part of flow improvers+)
 8.0 parts of high-impact additive+)

| Static heat test (180° C.) | | | | | | | |
|---|---|---|---|---|---|---|---|
| Exposure time [min] | 0 | 10 | 20 | 30 | 40 | 50 | 60 |
| Yellowness index | 2.9 | 5.5 | 8.5 | 20 | 42 | 45 | >100 |

EXAMPLE 11

Recipe:
 0.6 part of N-acetoacetyl-m-aminophenol
 100 parts of S-PVC (K value 58)
 4 parts of epoxidised soybean oil
 0.35 part of calcium stearate
 0.15 part of zinc stearate
 0.3 part of phenyl didecyl phosphite
 0.7 part of lubricant+)
 0.5 part of flow improvers+)
 8.0 parts of high-impact additive+)

| Static heat test (180° C.) | | | | | | |
|---|---|---|---|---|---|---|
| Exposure time [min] | 0 | 10 | 20 | 30 | 40 | 50 |
| Yellowness index | 3.5 | 8.2 | 16.8 | 58.7 | 91.1 | >100 |

EXAMPLE 12

Recipe: (Comparison without m-aminophenol)
 100 parts of S-PVC (K value 58)
 4 parts of epoxidised soybean oil
 0.35 part of calcium stearate
 0.15 part of zinc stearate
 0.3 part of phenyl didecyl phosphite
 0.7 part of lubricant+)
 0.5 part of flow improvers+)
 8.0 parts of high-impact additive+)

| Static heat test (180° C.) | | | | |
|---|---|---|---|---|
| Exposure time [min] | 0 | 10 | 20 | 30 |
| Yellowness index | 11.8 | 21.3 | 26 | >100 |

+) compare EXAMPLE 2

EXAMPLES 13–19

Dehydrochlorination test, according to DIN 53 381, B 1.3, on stabilisers to be used according to the invention, with the addition of co-stabilisers, according to the recipes shown below.

EXAMPLE 13

Recipe:
 S-PVC (K value 64) without additive

| Dehydrochlorination test (180° C.) | | | | | |
|---|---|---|---|---|---|
| Exposure time [min] | 10 | 20 | 30 | 40 | 50 |
| Hydrogen chloride split off [%] | 0 | 0.09 | 0.23 | 0.37 | 0.53 |

EXAMPLE 14

Recipe:
 0.46 part of 3-hydroxy-diphenylamine
 100 parts of S-PVC (K value 64)
 2 parts of epoxidised soybean oil

| Dehydrochlorination test (180° C.) | | | | |
|---|---|---|---|---|
| Exposure time [min] | 10 | 20 | 30 | 40 |
| Hydrogen chloride split off [%] | 0 | 0 | 0.035 | 0.20 |

EXAMPLE 15

Recipe:
 0.46 part of 3-hydroxy-diphenylamine
 100 parts of S-PVC (K value 64)

2 parts of epoxidised soybean oil
1.26 parts of tridecyl phosphite

| Dehydrochlorination test (180° C.) | | | | | |
|---|---|---|---|---|---|
| Exposure time [min] | 10 | 20 | 30 | 40 | 50 |
| Hydrogen chloride split off [%] | 0 | 0 | 0 | 0.005 | 0.11 |

EXAMPLE 16

Recipe:
0.38 part of 2-amino-4-hydroxybenzamide
100 parts of S-PVC (K value 64)
2 parts of epoxidised soybean oil

| Dehydrochlorination test (180° C.) | | | | | | |
|---|---|---|---|---|---|---|
| Exposure time [min] | 10 | 20 | 30 | 40 | 50 | 60 |
| Hydrogen chloride split off [%] | 0 | 0 | 0.015 | 0.025 | 0.06 | 0.16 |

EXAMPLE 17

Recipe:
0.33 part of 2-amino-4-hydroxybenzonitrile
100 parts of S-PVC (K value 64)
2 parts of epoxidised soybean oil

| Dehydrochlorination test (180° C.) | | | | | | |
|---|---|---|---|---|---|---|
| Exposure time [min] | 10 | 20 | 30 | 40 | 50 | 60 |
| Hydrogen chloride split off [%] | 0 | 0.02 | 0.035 | 0.06 | 0.11 | 0.30 |

EXAMPLE 18

Recipe:
0.57 part of 3,5-dihydroxy-N-benzoylaniline
100 parts of S-PVC (K value 64)
2 parts of epoxidised soybean oil

| Dehydrochlorination test (180° C.) | | | | | | | | |
|---|---|---|---|---|---|---|---|---|
| Exposure time [min] | 10 | 20 | 30 | 40 | 50 | 60 | 70 | 80 |
| Hydrogen chloride split off [%] | 0 | 0 | 0.015 | 0.030 | 0.050 | 0.090 | 0.150 | 0.28 |

EXAMPLE 19

Recipe:
0.52 part of methyl 3-(3-hydroxyanilino)-2-methylacrylate
100 parts of S-PVC (K value 64)
2 parts of epoxidised soybean oil

| Dehydrochlorination test (180° C.) | | | | | | |
|---|---|---|---|---|---|---|
| Exposure time [min] | 10 | 20 | 30 | 40 | 50 | 60 |
| Hydrogen chloride split off [%] | 0 | 0 | 0.005 | 0.060 | 0.16 | 0.310 |

What is claimed is:
1. A stabilized composition which comprises
(a) a chlorine-containing thermoplastic, and
(b) from 0.05 to 5 percent by weight, based on component (a), of a compound of formula I

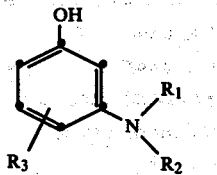

in which $R_1$ is hydrogen, $C_1$-$C_{18}$-alkyl, $C_5$-$C_7$-cycloalkyl, unsubstituted or $C_1$-$C_4$-alkyl-substituted or hydroxyl-substituted phenyl or one of the groups —$C(R_4)$=$C(R_5)$—$COOR_6$, —$CH_2CH_2$—$CN$,

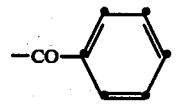

or —CO—$CH_2$—CO—$CH_3$, $R_2$ is hydrogen, $C_1$-$C_{18}$-alkyl, $C_5$-$C_7$-cycloalkyl, unsubstituted or $C_1$-$C_4$-alkyl-substituted or hydroxyl-substituted phenyl or a —$CH_2CH_2$—$CN$ group, $R_3$ is hydrogen, hydroxyl, $C_1$-$C_4$-alkyl, $C_2$-$C_5$-alkoxycarbonyl, aminocarbonyl or cyano, $R_4$ and $R_5$ independently of one another are hydrogen or $C_1$-$C_4$-alkyl and $R_6$ is $C_1$-$C_{18}$-alkyl or $C_5$-$C_7$-cycloalkyl.

2. A composition according to claim 1 wherein component (b) is 2-amino-4-hydroxybenzonitrile, 2-amino-4-hydroxybenzamide, 3,5-dihydroxy-N-benzoylaniline, methyl 3-(3-hydroxyanilino)-2-methylacrylate, N-acetoacetyl-m-aminophenol or N-(2-cyanoethyl)-m-aminophenol.

3. A composition according to claim 1, which contains as component (b) a compound of the formula I, in which $R_1$ is hydrogen, branched or unbranched $C_8$-$C_{16}$-alkyl, cyclohexyl, phenyl, methylphenyl or a —$C(R_4)$=$C(R_5)$—$COOR_6$, —$CH_2CH_2$—$CN$, or —CO—$CH_2$—CO—$CH_3$ group, $R_2$ is hydrogen, $R_3$ is hydrogen, hydroxyl, methyl, methoxycarbonyl, aminocarbonyl or cyano, $R_4$ and $R_5$ independently of one another are hydrogen or methyl and $R_6$ is methyl or cyclohexyl.

4. A composition according to claim 1, which contains as component (b) m-aminophenyl, N-phenyl-m-aminophenol, 2-amino-4-hydroxybenzamide, 3-hydroxy-5-methyldiphenylamine or methyl 3-(3-hydroxyanilino)-2-methylacrylate.

5. A composition according to claim 1, which additionally contains one or more stabilisers selected from the group consisting of epoxy compounds, phosphites, organic metal compounds of metals of the second main group and sub-group of the periodic table, inorganic salts of metals of the second sub-group of the periodic table, and organo-tin compounds.

6. A composition according to claim 5, which contains at least one epoxy compound and/or one metal carboxylate or phenolate of a metal of the second main group of the periodic table.

7. A composition according to claim 5, which contains at least one phosphite.

8. A composition according to claim 6, which additionally contains at least one phosphite.

9. A composition according to claim 6, which additionally contains at least one zinc carboxylate or cadmium carboxylate or an organo-tin compound.

10. A composition according to claim 9, which additionally contains at least one phosphite.

11. A composition according to claim 1, wherein component (a) is poly(vinyl chloride).

* * * * *